United States Patent [19]

Gandhi et al.

[11] Patent Number: 4,780,636
[45] Date of Patent: Oct. 25, 1988

[54] LIP STRUCTURE FOR A STATOR IN A DYNAMO-ELECTRIC MACHINE

[75] Inventors: Deepakkumar J. Gandhi; Thomas W. Neumann, both of Fort Wayne, Ind.

[73] Assignee: General Electric Company, Fort Wayne, Ind.

[21] Appl. No.: 19,811

[22] Filed: Feb. 27, 1987

[51] Int. Cl.$^4$ .............................................. H02K 1/00
[52] U.S. Cl. .................................... 310/216; 310/42; 310/214; 310/254
[58] Field of Search .............. 310/216, 180, 217, 184, 310/211, 179, 254, 258, 259, 42, 214, 215; 29/596

[56] References Cited

U.S. PATENT DOCUMENTS

| | | | |
|---|---|---|---|
| 2,610,225 | 9/1952 | Korski | 310/217 |
| 2,700,115 | 1/1955 | Mowery, Jr. | 310/216 |
| 2,701,317 | 2/1955 | Herman | 310/215 |
| 2,819,514 | 1/1958 | Polard | 310/215 |
| 3,229,134 | 1/1966 | Rakula | 310/216 |
| 3,253,171 | 5/1966 | Strock | 310/217 |
| 3,469,136 | 9/1969 | Jenkinson | 310/216 |
| 3,735,169 | 5/1973 | Balke | 310/214 |
| 3,821,846 | 7/1974 | Pleiss, Jr. et al. | 29/596 |
| 3,827,141 | 8/1974 | Hallerback | 29/596 |
| 3,842,493 | 10/1974 | Ohuchi et al. | 29/596 |
| 4,090,290 | 5/1978 | Clark | 29/596 |
| 4,486,506 | 12/1984 | Kenjo et al. | 428/475.2 |

FOREIGN PATENT DOCUMENTS

| | | | |
|---|---|---|---|
| 1169617 | 12/1958 | France | 310/214 |
| 0020134 | 2/1982 | Japan | 310/215 |
| 0261540 | 1/1970 | U.S.S.R. | 310/216 |

Primary Examiner—R. Skudy
Attorney, Agent, or Firm—Ralph E. Krisher, Jr.

[57] ABSTRACT

Laminations used in a lamination stack to form a stator of a dynamo-electric machine, have a number of circumferentially spaced slot openings extending radially outward from an inner circumference of a bore opening in each of the plates. The mouths of the slot openings are wide enough to receive a stator winding when inserted between teeth which bound the slot openings. Each tooth has a main body part and a pair of lip parts at a distal end, with each lip part projecting circumferentially into the mouth of a respective slot opening adjacent the tooth. An edge of each lip part projects from the main body part to retain the stator winding, the edge defining a slope angle with respect to a line perpendicular to the center line of the slot opening into which the lip part projects. The slope angle is functionally related to the width of the main body part of the teeth.

21 Claims, 4 Drawing Sheets

LIP STRUCTURE FOR A STATOR IN A DYNAMO-ELECTRIC MACHINE

RELATIONSHIP TO OTHER APPLICATIONS

This application No. 03 GP 6093 is being filed on the same day as commonly assigned applications Nos. 03 GP 6077 - BASE ASSEMBLY FOR DYNAMO-ELECTRIC MACHINE in the name of Robert L. Sieber, Ser. No. 019,823; 03 GP 6082 - DYNAMO-ELECTRIC MACHINE LAMINATION CONSTRUCTION in the name of Thomas W. Neumann, Ser. No. 020,297; and 03 GP 6073 - CLOSED SLOT ROTOR CONSTRUCTION in the names of Deepakkumar J. Gandhi et al., Ser. No. 020,299.

BACKGROUND OF THE INVENTION

1. FIELD OF THE INVENTION

The present invention relates generally to stator constructions for dynamo-electric machines, and more particularly to a laminated stator comprised of a stack of plate laminations, wherein each of the laminations has a number of teeth extending radially from an inner bore opening, the teeth including lip parts to retain a stator winding with a closure wedge embedded in slots formed between adjacent teeth.

2. DESCRIPTION OF THE KNOWN ART

Laminated stators for dynamo-electric machines are known generally from, for example, U.S. Pat. No. 3,469,136 (Sept. 23, 1969). Basically, the machine stator is comprised of a number of annular plate laminations of ferromagnetic material, stacked face-to-face with one another. Each plate has a circular inner opening to form a stator bore when the plates are stacked, and a number of equally circumferentially spaced slot openings extending radially from the circumference of the inner opening to form a number of teeth between which one or more stator windings are to be embedded.

When the plate laminations are stacked in proper alignment to form the stator, the winding slots in each plate together form a number of stator winding slots or recesses which extend generally parallel to the axis of the stator bore and a certain depth radially outward from the bore. One or more stator windings are then wound through selected ones of the slots between adjacent teeth, according to the number of poles desired for the machine. Prior to inserting the winding conductors, a slot insulator or liner is usually inserted to extend axially along each slot in contact with the lamination material, to prevent arcing or short-circuiting between the winding conductors and the ferromagnetic material, of which the laminations are made.

Each winding conductor is then inserted through mouth openings formed between adjacent teeth to enter the slot and, when all conductors of the winding or windings associated with the slot are in place, a closure wedge is inserted into the mouth slot, and lip parts of adjacent teeth which project into the mouth of the slot retain the wedge in place. See, for example, U.S. Pat. No. 4,486,506 (Dec. 4, 1984). Until now, it has been the practice to incline the edge of each lip part which edge faces the closure wedge, at an angle of 22.5 degrees relative to a line perpendicular to the slot center line. It has been found, however, that for a given mouth opening between confronting lip parts of adjacent teeth, the 22.5 degree inclination angle may not be sufficient to seat the closure wedges firmly in place with the result that the wedge and possibly some of the winding conductors protrude from the slot mouth and contact the machine rotor with damaging results.

SUMMARY OF THE INVENTION

It has been found that by making the lip part inclination or slope angle a function of the stator tooth width for a given mouth opening, the closure wedges, winding conductors, and slot insulators will remain securely in place within the stator slots by the seating action of the lip parts.

An object of the invention is to overcome the above and other shortcomings in the known lip structures for stator laminations in a dynamo-electric machine.

Another object of the invention is to provide a lip structure which will minimize local flux saturation where a lip part is joined to a main body part of a stator tooth.

According to the invention, a lamination for use in a laminated stator of a dynamo-electric machine, includes a flat annular plate of ferromagnetic material with a generally circular inner opening to form a stator bore when like ones of the plate are stacked face to face. The plate has a number of equally circumferentially spaced slot openings extending from the circumference of the inner opening to form a number of teeth, the distal ends of which together define the circumference of the inner opening in the plate. Each of the teeth has a main body part and a pair of lip parts at its distal end, with each lip part projecting circumferentially into the mouth of a respective slot opening adjacent the tooth. Each lip part has an edge projecting from the main body part of the tooth to retain a stator winding and closure wedge when inserted in a slot opening adjacent the tooth, said edge being inclined to define a slope angle with respect to a line perpendicular to the center line of the slot opening into which the lip part projects. The slope angle for the lip parts is functionally related to the width of the teeth.

According to another aspect of the invention, a dynamo-electric machine includes a generally cylindrical casing, a stator fixed in the casing and including a stack of plate laminations having a cylindrical bore, a stator winding embedded in stator slots which extend radially outward from the circumference of the bore and generally parallel to the bore axis, a number of wedges each for containing the stator winding within the slots wherein the wedges are seated against lip parts of stator teeth adjacent the slots, and a rotor supported by the casing in the bore for rotational movement about the bore axis. Each of the plate laminations forming the stator is comprised of a flat annular plate of ferromagnetic material with a circular inner opening to form the stator bore when stacked face-to-face with other like plates, each plate having a number of equally circumferentially spaced slot openings extending radially outward from the circumference of the inner opening to form a number of teeth with the mouths of the slot openings being sufficiently wide to receive a stator winding when inserted between the teeth. Each of the teeth has a main body part and a pair of lip parts at a distal end with each lip part projecting circumferentially into the mouth of a respective slot opening adjacent the tooth. Each lip part has an edge projecting from the main body part to seat one side of an associated wedge when inserted in the stator slots. The edge is inclined to define a slope angle with respect to a line perpendicular to the center line of the slot opening into which the lip parts project, and the slope angle is functionally related to the width of the teeth.

The various features of novelty which characterize the invention are pointed out with particularity in the claims annexed to and forming a part of the present disclosure. For a better understanding of the invention, its operation advantages and specific objects attained by its use, reference should be had to the accompanying drawing and descriptive matter in which there are illustrated and described preferred embodiments of the invention.

DETAILED DESCRIPTION OF THE INVENTION

Figure 1:
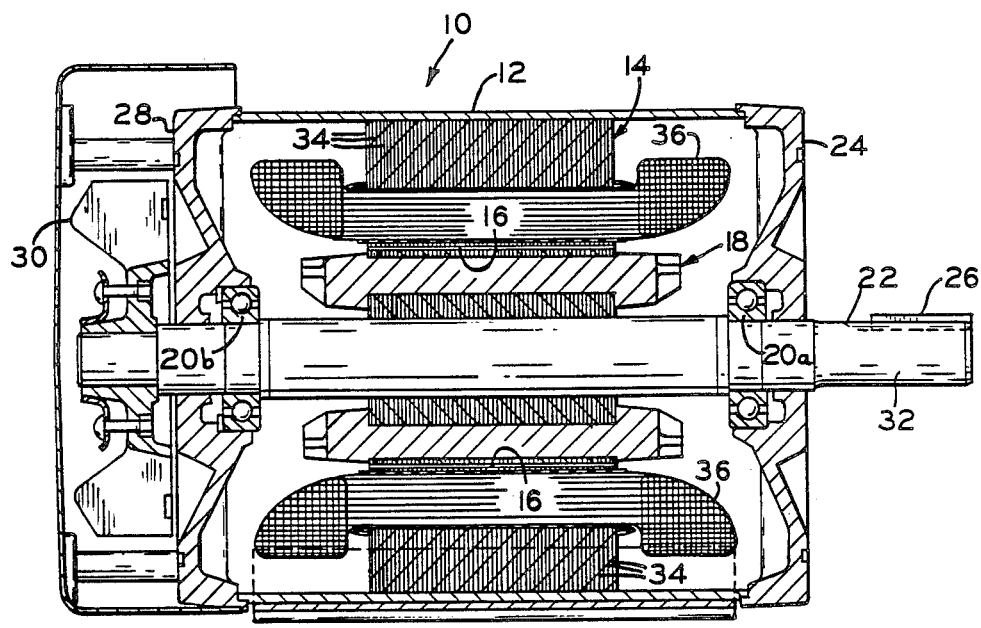
FIG. 1 is a side view, partly in section, of a dynamoelectric machine in which the present invention may be embodied.
Figure 2:
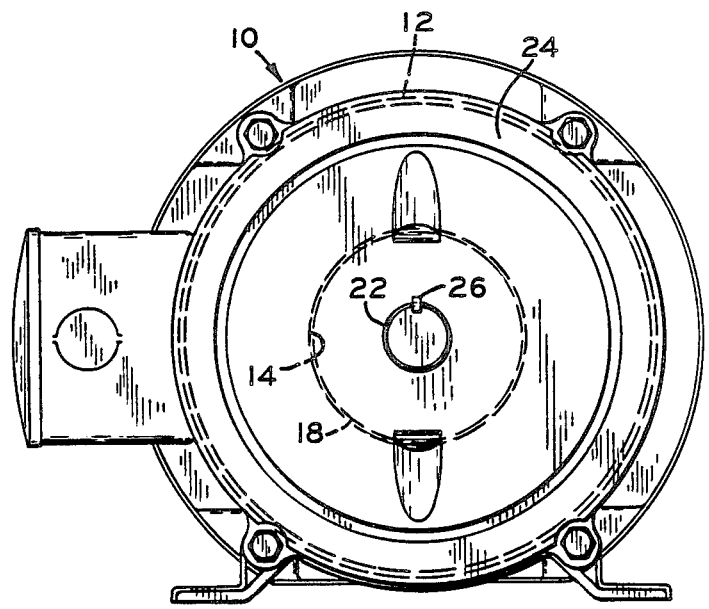
FIG. 2 is a front view of the machine in FIG. 1.

FIG. 1 shows a side view, in section, of a dynamo electric machine 10, in which the present invention may be embodied. A front view of the machine 10 is shown in FIG. 2.

Basically, the machine 10 includes a generally cylindrical outer casing 12, and a generally cylindrical stator 14 fixed coaxially within the outer casing 12 and having a coaxial stator bore 16. A rotor 18 is supported by suitable bearings 20a, 20b at the front and back of casing 12, to extend axially within the stator bore 16 and for rotational movement about the bore axis. In the particular example shown, a shaft part 22 of the rotor 18 extends axially from a front end shield 24 of the machine 10, and has a key 26 projecting radially outward from a recess cut axially a certain distance from the front of the shaft part 22. Key 26 serves to lock the shaft part 22 into a corresponding key way cut in a load member (not shown) e.g. a fan, to which rotational motive power is to be supplied by the machine 10.

A back end shield 28 (FIG. 1) together with the casing 12 and the front end shield 24 serve to contain and protect the stator 14, rotor 18 and associated conductive windings. In the example shown a machine cooling fan 30 is mounted on a rotor stub part 32 which extends outside the back end shield 28, and directs an air current flow over the casing.

As shown in FIG. 1, the stator 14 is comprised of a stack of plate laminations 34 of ferromagnetic material. The laminations 34 are stacked face-to-face and are suitably adhered to one another by means well known in the art. Slots which extend over the axial length of the stator 14 a certain radial depth from the stator bore 16, accommodate one or more stator windings, the end turns 36 of which are shown in FIG. 1. Details of the individual plate laminations 34 are given below in connection with FIGS. 3 and 4.

Figure 3:
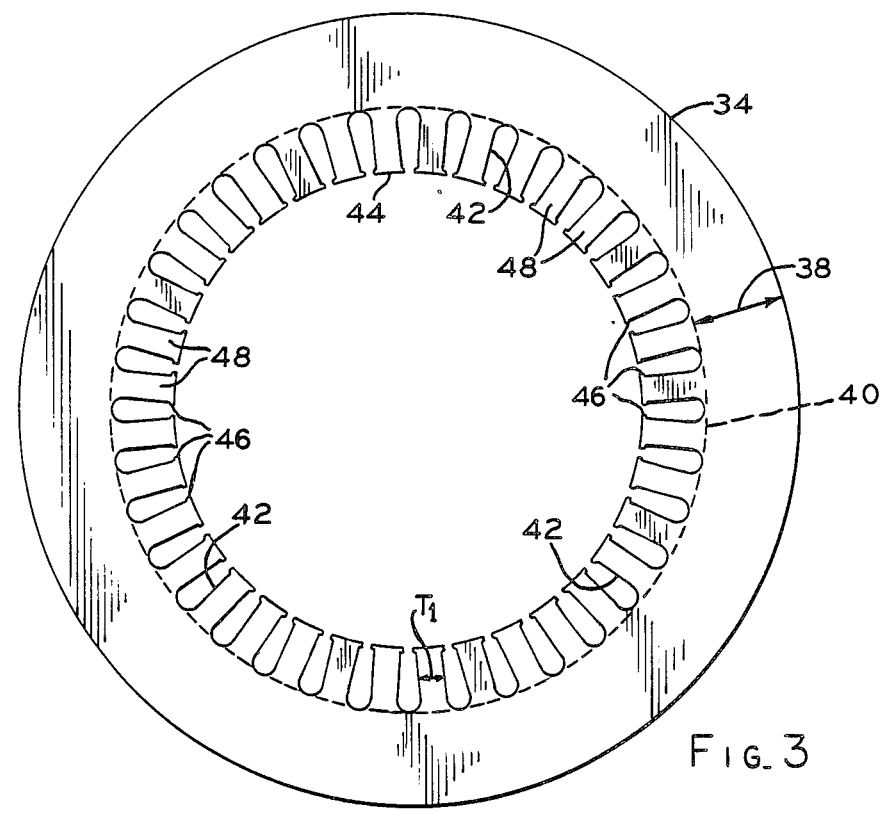
FIG. 3 is a plan view of a plate lamination for forming a stator in the machine of FIGS. 1 & 2, showing teeth with lip parts according to the invention.

In FIG. 3, a plate lamination 34 in annular form includes an annular yoke portion 38 which extends from a circular outer periphery of the lamination 34 to a circumferential line 40 which defines the depths of a number of equally circumferentially spaced slot openings 42 from the circumference 44 of an inner opening in the lamination 34. It will be understood that when the lamination 34 is stacked face-to-face with other like laminations, the inner circumference 44 defines the diameter of the stator bore 16, and the individual slot openings 42 of the stacked laminations 34 are circumferentially aligned to form the axially extending slots within which the stator windings are embedded in the machine 10 of FIG. 1. The stator winding is inserted in the slot openings 42 through mouths 46 of the slot openings which mouths are wide enough to receive individual conductors of the stator winding.

A number of teeth 48 are formed between adjacent slot openings 42, the teeth having main body parts 50 and lip parts 52 at distal ends of the teeth. Each lip part 52 projects circumferentially into the mouth 46 of a respective slot opening 42 adjacent the associated tooth 48.

Figure 4:
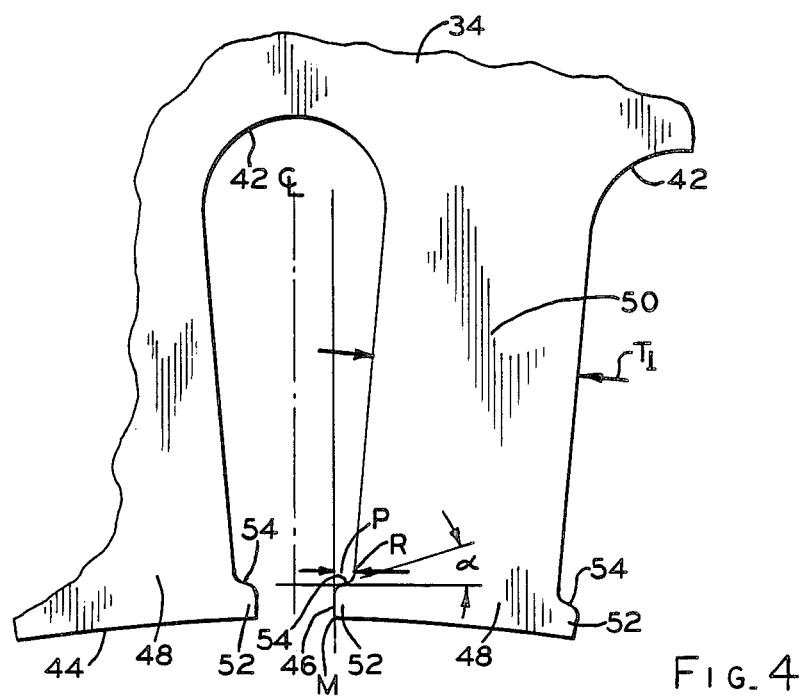
FIG. 4 is an enlarged view of a part of the lamination in FIG. 3.
Figure 7:
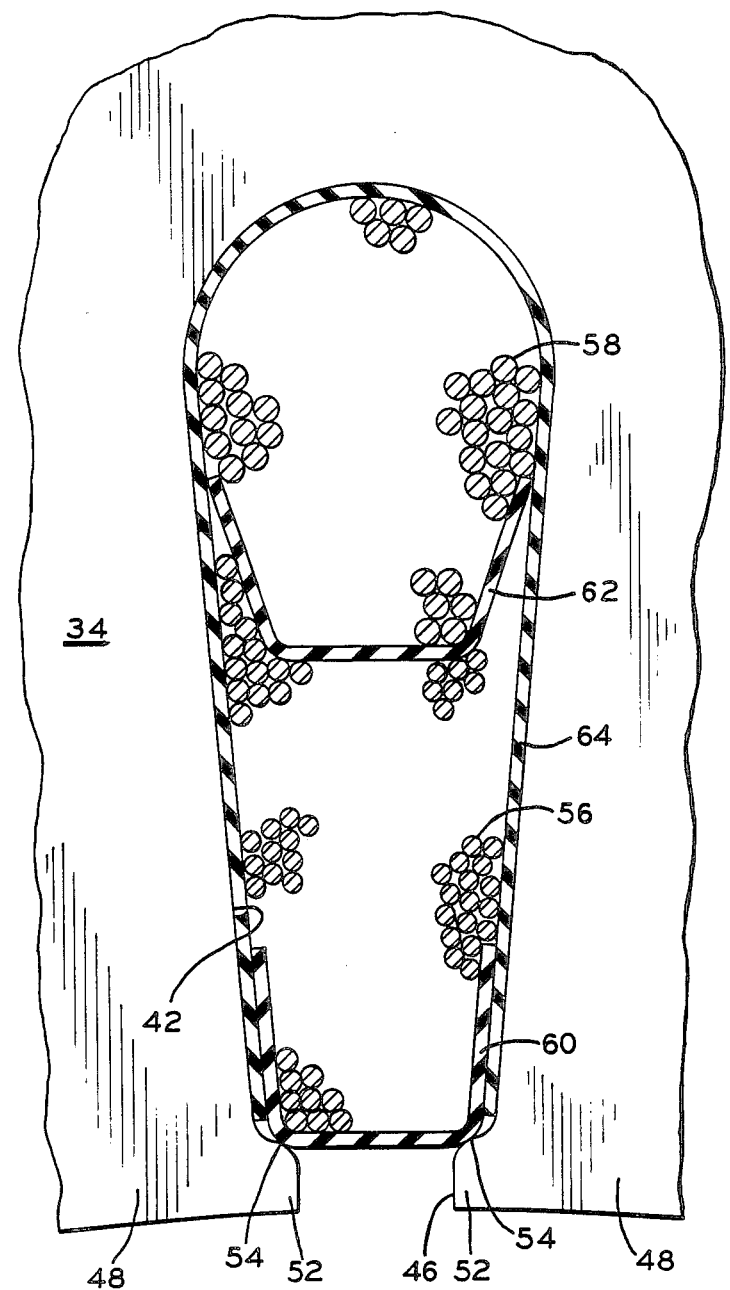
FIG. 7 is a view of a slot opening in part of a lamination, showing an insulating wedge seated against lip parts of adjacent teeth according to the invention.

As shown in FIG. 4, each lip part 52 has an inclined edge 54 projecting from the main body part 50 of an associated tooth. The edges 54 serve to retain a stator winding or windings and a closure wedge when the winding conductors are inserted in the slot opening 42 into which the edge 54 of the lip part 52 projects. FIG. 7 shows one example in which two stator windings 56, 58 are contained in each slot opening 42 by way of an insulated wedge 60 and an insulating winding separator 62. An insulative liner 64 is also placed within the slot opening 42 after the laminations 34 are stacked to define the winding slots in the machine stator 14 (FIG. 1).

Each of the teeth 48 has a certain width $T_1$ about a radial center line through its main body part 50, as shown in FIG. 4. Moreover, the inclined edges 54 of the lip parts 52 define a slope angle $\alpha$ with respect to a line perpendicular to a center line of the slot opening 42 into which the lip part projects a distance P (see FIG. 4). The distance P is measured from the beginning of curvature point R to a line parallel to the slot center line, such line passing through the furthermost point M of the tooth tip toward the center line of the slot.

In accordance with the invention, the slope angle $\alpha$ for the lip part edges is functionally related to the width $T_1$ of the teeth 48. Preferably, the slope angle $\alpha$ varies in inverse relation to the width $T_1$ of the main body parts 50 of the teeth 48 for a given circumferential opening for the mouths 46 of the opening 42. Such a relationship between the slope angle $\alpha$ and the teeth width $T_1$ ensures that the stator winding or windings contained in the slot openings 42 and the closure wedge 60 will be firmly held in place by the lip parts 52 of adjacent teeth, while the machine 10 is operating. Specifically, it will be seen in FIG. 7, that if too steep a slope angle were provided for the edges of the lip parts 52, the wedge 60 may become unseated and project out of the mouth 46 of the slot opening 42. It will be understood that such dislocation of the wedge and possibly the stator winding would disturb the flux paths established through an air gap between the inner circumference of the stator 14 and the outer circumference of the rotor 18 in the machine 10 of FIG. 1. Operating performance will then suffer and, if the wedge or stator winding advances through the air gap and crashes against the outer surface of the rotor 18 while turning at high speed, irreparable damage can result.

It has been discovered that a slope angle α in the range of from 15 degrees to 22 degrees provides superior seating reliability for stator winding wedges 60, particularly when the lip parts 52 project into the slot openings by only about 0.71 mm. as may occur if a width $T_1$ of 6.9 mm. is chosen for the width of the teeth 48, as shown in FIG. 4.

In such case, the slope angle α is preferably about 17.5 degrees.

Figure 5:
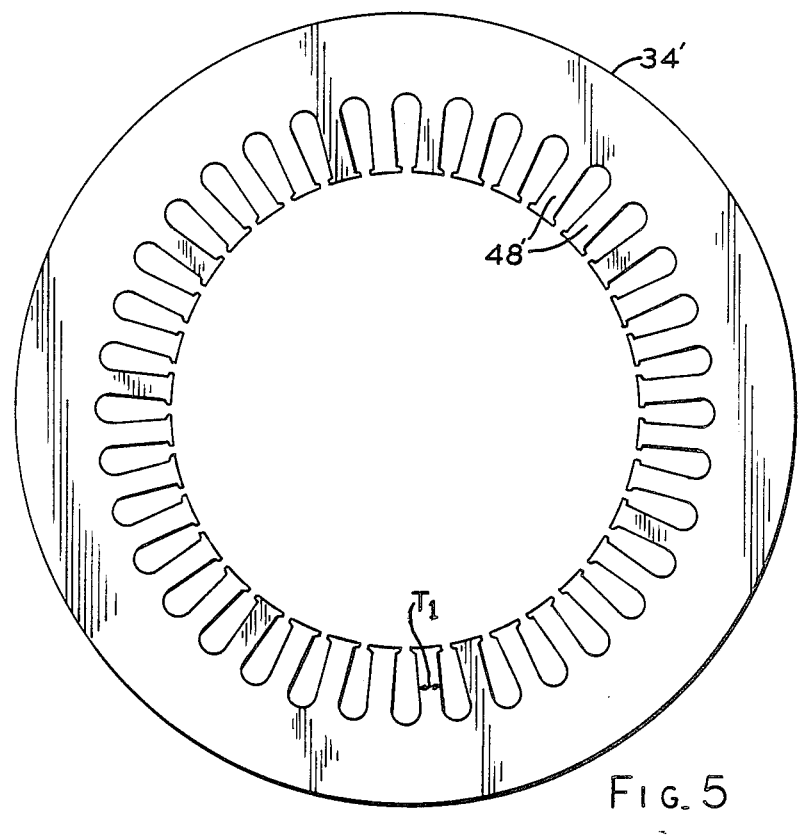
FIG. 5 is a plan view of another plate lamination for forming a stator in the machine of FIGS. 1 and 2, showing teeth with lip parts according to the invention.
Figure 6:
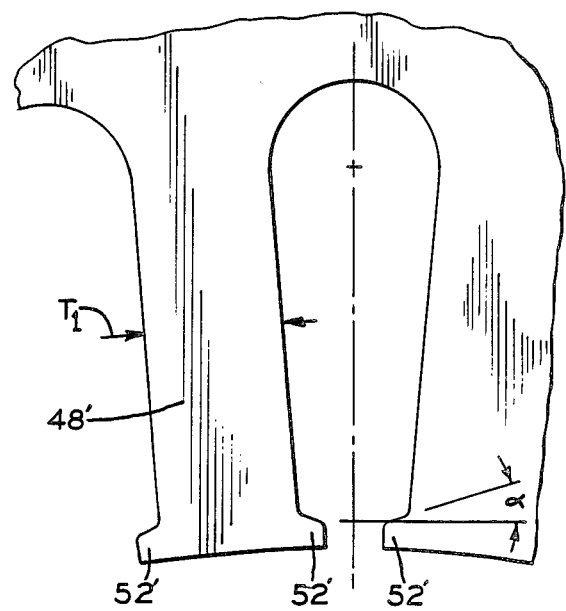
FIG. 6 is an enlarged view of a part of the lamination in FIG. 5.

When the lips part 52 project circumferentially into the slot openings 42 by greater amounts such as by about 1.125 mm. the slope angle α may then be selected to be greater than the 22.5 degree standard, so as to avoid saturation of the lamination material at the point where the edges 54 of the lip parts meet the main body parts 50 of the teeth 48. A plate lamination 34' with stator teeth 48' having lip parts 52' of such proportions is shown in FIGS. 5 and 6. The width $T_1$ for the teeth 48' in the FIGS. 5 and 6 embodiment is about 6.1 mm. To avoid localized flux saturation, but still ensure proper seating of the stator winding wedges the angle α for the lip parts 52' can be in the range of from 23 degrees to 30 degrees, preferably 27.5 degrees. Likewise such angles could be used for a lip width in the range of 1.1 mm. to 2.1 mm.

While the foregoing description represents preferred embodiment of the invention, it will be obvious to those skilled in the art that various advantages and modifications may be made, without departing from the true spirit and scope of the invention.

What is claimed is:

1. A lamination for use in a lamination stack forming a stator in a dynamo-electric machine, comprising:
   a flat annular plate of ferro-magnetic material having a substantially continuous outer periphery, and a generally circular inner opening to form a stator bore in the machine stator when like ones of said annular plate are stacked face-to-face;
   said plate having a number of uniformly circumferentially spaced slot openings extending radially outward from a circumference of said inner opening to form a number of teeth of predetermined width, wherein said slot openings have mouths sufficiently wide to receive a stator winding when inserted between said teeth and distal ends of said teeth together define the circumference of said inner opening;
   each of said teeth having a main body part extending radially from its distal end and a pair of lip parts at the distal end wherein each of said lip parts projects circumferentially into each of said mouths of each of said slot openings adjacent each of said teeth;
   each of said lip parts having an inclined edge projecting from the main body part of an associated tooth for retaining the stator winding when inserted in each of said slot openings adjacent each of said teeth, said inclined edge sloping radially inward to define a slope angle with respect to a line perpendicular to the center line of each of the slot openings into which the lip parts project;
   wherein said slope angle varies in inverse relation to the width of the main body parts of said teeth wherein each of said lip parts projects into each of adjacent slot openings from about 0.71 mm to about 2.1 mm.

2. The lamination according to claim 1, wherein said slope angle is in the range of from 15 degrees to 22 degrees.

3. The lamination according to claim 1, wherein said slope angle is about 17.5 degrees.

4. The lamination according to claim 1, wherein each lip part projects into each adjacent slot openings about 0.71 mm. and said slope angle is about 17.5 degrees.

5. The lamination according to claim 2, wherein each lip part projects into each adjacent slot openings about 0.71 mm., the width of said teeth is about 6.9 mm., and said slope angle is about 17.5 degrees.

6. The lamination according to claim 1, wherein said slope angle is in the range of from 23 degrees to 30 degrees.

7. The lamination according to claim 1, wherein said slope angle is about 27.5 degrees.

8. The lamination according to claim 1, wherein each lip part projects into each adjacent slot openings about 1.125 mm.

9. The lamination according to claim 1, wherein each lip part projects into each adjacent slot openings about 1.125 mm. and the width of each of said teeth is about 6.1 mm.

10. The lamination according to claim 6, wherein for a given width for said teeth, said slope angle is selected to minimize saturation of said stator winding flux at points where the inclined edges of the lip parts intersect the main body part of each tooth.

11. The lamination according to claim 1, wherein the width of each said lip parts is in the range of 1.1 mm. to 2.1 mm. and said slope angle is about 27.5 degrees.

12. A dynamo-electric machine, comprising:
    a generally cylindrical casing;
    a stator fixed in said casing and comprised of a stack of plate laminations of ferromagnetic material, said stator having a cylindrical bore;
    a stator winding embedded in stator slots which extend radially outward from the circumference of said bore;
    a number of wedges each for containing the stator winding within corresponding ones of said slots, wherein said wedges are sealed against lip parts of stator teeth adjacent said slots, and
    a rotor supported by said casing in said bore for rotational movement about the bore axis, said rotor including conductive means for interacting with a magnetic field when said stator winding is energized by an outside electrical source;
    wherein each of said plate laminations comprises:
    a flat annular plate of ferromagnetic material having a circular inner opening to form the rotor bore in the machine stator when like ones of said annular plates are stacked face-to-face;
    said plate having a number of equally circumferentially spaced slot openings extending radially outwardly from the circumference of said inner opening to form a number of teeth of predetermined width, wherein said slot openings have mouths sufficiently wide to receive said stator winding when inserted between said teeth, and distal ends of said teeth together define the circumference of said inner opening;
    each of said teeth having a main body part extending radially from its disal end and a pair of lip parts at the distal end wherein each of said lip parts projects circumferentially into each of said mouths of a slot opening adjacent each of said teeth;

each of said lip parts having an inclined edge projecting from the main body part of each of said teeth for seating a wide part of one of said wedges when inserted in each of said slot openings adjacent each of said teeth, said inclined edge sloping radially inward to define a slope angle with respect to a line perpendicular to the center line of each of said slot openings into which each of the lip parts projects;

wherein said slope angle varies in inverse relation to the width of the main body parts of said teeth wherein each of said lip parts project each of adjacent slot openings from about 0.71 mm.

13. The dynamo-electric machine according to claim 12, wherein said slope angle is in the range of from 15 degrees to 22 degrees.

14. The dynamo-electric machine according to claim 12, wherein said slope angle is about 17.5 degrees.

15. The dynamo-electric machine according to claim 12, wherein each lip part projects into each adjacent slot opening about 0.71 mm. and said slope angle is about 17.5 degrees.

16. The dynamo-electric machine according to claim 13, wherein each lip part projects into each adjacent slot opening about 0.71 mm., the width of said teeth is about 6.9 mm. and said slope angle is about 17.5 degrees.

17. The dynamo-electric machine according to claim 12, wherein said slope angle is in the range of from 23 degrees to 30 degrees.

18. The dynamo-electric machine according to claim 12, wherein said slope angle is about 27.5 degrees.

19. The dynamo-electric machine according to claim 12, wherein each lip part projects into each adjacent slot opening about 1.125 mm.

20. The dynamo-electric machine according to claim 12, wherein each lip part projects into each adjacent slot opening about 1.125 mm. and the width of said teeth is about 6.1 mm.

21. The dynamo-electric machine according to claim 17, wherein for a given width for said teeth on each plate lamination, said slope angle is selected to minimize saturation of stator winding flux at points where the inclined edges of the lip part intersect the main body part of each tooth when said stator winding is energized.

* * * * *